(12) United States Patent
Wang et al.

(10) Patent No.: US 11,206,378 B2
(45) Date of Patent: *Dec. 21, 2021

(54) CAMERA MODULE ALIGNING METHOD

(71) Applicant: PRIMAX ELECTRONICS LTD., Taipei (TW)

(72) Inventors: Hsiu-Wen Wang, Taipei (TW); Chih-Wen Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,112

(22) Filed: Jun. 24, 2020

(65) Prior Publication Data

US 2021/0329201 A1 Oct. 21, 2021

(30) Foreign Application Priority Data

Apr. 15, 2020 (TW) ................ 109112614

(51) Int. Cl.
*H04N 17/02* (2006.01)
*G06T 7/80* (2017.01)
*G06T 7/70* (2017.01)
*H04N 9/093* (2006.01)
*H04N 17/04* (2006.01)
*H04N 5/232* (2006.01)
*H04N 5/225* (2006.01)

(52) U.S. Cl.
CPC .............. *H04N 9/093* (2013.01); *G06T 7/70* (2017.01); *G06T 7/80* (2017.01); *H04N 5/225* (2013.01); *H04N 5/23299* (2018.08); *H04N 17/02* (2013.01); *H04N 17/04* (2013.01)

(58) Field of Classification Search
CPC .......... H04N 17/02; H04N 17/04; G06T 7/70; G06T 7/80
See application file for complete search history.

(56) References Cited

U.S. PATENT DOCUMENTS

| | | | | |
|---|---|---|---|---|
| 6,437,823 | B1 * | 8/2002 | Zhang | H04N 17/002 |
| | | | | 348/187 |
| 8,811,718 | B2 * | 8/2014 | Anai | G01C 11/06 |
| | | | | 382/154 |
| 8,953,847 | B2 * | 2/2015 | Moden | G06T 7/70 |
| | | | | 382/106 |
| 9,800,867 | B2 * | 10/2017 | Itoh | H04N 17/002 |
| 9,870,616 | B2 * | 1/2018 | Kikuchi | G06K 9/6201 |
| 9,965,870 | B2 * | 5/2018 | Claveau | G06T 7/80 |
| 9,986,224 | B2 * | 5/2018 | Mullis | H04N 13/246 |

(Continued)

*Primary Examiner* — Brian P Yenke
(74) *Attorney, Agent, or Firm* — WPAT, PC

(57) ABSTRACT

A camera module aligning method includes the following steps. Firstly, a reference chart having plural chart characteristic points is provided. Then, a camera module is used to shoot the reference chart, and an installation position and an installation posture of the camera module are acquired according to an internal parameter matrix and an external parameter matrix. When the camera module shoots the reference chart and an image is formed on an imaging plane of the camera module, a relationship between at least one image characteristic point of the image and the corresponding chart characteristic point complies with a standard relationship. The standard relationship is defined by the internal parameter matrix and the external parameter matrix.

8 Claims, 4 Drawing Sheets

(56) References Cited

U.S. PATENT DOCUMENTS

| | | | |
|---|---|---|---|
| 10,484,665 B2* | 11/2019 | Nobori | H04N 13/246 |
| 10,943,360 B1* | 3/2021 | Crozier | E02F 3/32 |
| 10,958,817 B1* | 3/2021 | Wang | H04N 5/2628 |
| 2003/0222984 A1* | 12/2003 | Zhang | H04N 17/002 |
| | | | 348/187 |
| 2010/0253622 A1* | 10/2010 | Makita | G06F 3/0325 |
| | | | 345/158 |
| 2012/0105585 A1* | 5/2012 | Masalkar | H04N 13/271 |
| | | | 348/46 |
| 2012/0293667 A1* | 11/2012 | Baba | H04N 7/00 |
| | | | 348/187 |
| 2013/0322698 A1* | 12/2013 | Moden | G06T 7/77 |
| | | | 382/107 |
| 2015/0189267 A1* | 7/2015 | Kaji | G06T 3/0093 |
| | | | 348/187 |
| 2016/0360195 A1* | 12/2016 | Itoh | H04N 13/246 |
| 2017/0111558 A1* | 4/2017 | Brueckner | G06T 7/80 |
| 2017/0289526 A1* | 10/2017 | Sasatani | G06K 9/4604 |
| 2018/0316905 A1* | 11/2018 | Nobori | B60R 1/00 |
| 2019/0147625 A1* | 5/2019 | Jia | H04N 13/246 |
| | | | 348/187 |
| 2019/0253611 A1* | 8/2019 | Wang | H04N 5/23299 |
| 2019/0295291 A1* | 9/2019 | Raag | G06T 7/70 |
| 2020/0012858 A1* | 1/2020 | Xiang | G06K 9/6202 |
| 2020/0027243 A1* | 1/2020 | Ziegler | G06T 7/85 |
| 2020/0273205 A1* | 8/2020 | Yamashita | G06T 15/20 |
| 2020/0311979 A1* | 10/2020 | Chang | G06T 7/70 |
| 2021/0042962 A1* | 2/2021 | Zhang | G06T 7/80 |
| 2021/0103143 A1* | 4/2021 | Chang | G06T 7/80 |
| 2021/0110575 A1* | 4/2021 | Hu | H04N 17/002 |
| 2021/0142517 A1* | 5/2021 | Jia | H04N 17/002 |

* cited by examiner

CAMERA MODULE ALIGNING METHOD

FIELD OF THE INVENTION

The present invention relates to an optical field, and more particularly to a camera module aligning method.

BACKGROUND OF THE INVENTION

Recently, with the development of electronic industries and the advance of industrial technologies, various electronic devices are designed toward small size, light weightiness and easy portability. Consequently, these electronic devices can be applied to mobile business, entertainment or leisure purposes whenever or wherever the users are. For example, various camera modules are widely used in many kinds of fields such as smart phones, wearable electronic devices or any other appropriate portable electronic devices. Since the electronic devices are small and portable, the users can take the electronic devices to capture images and store the images according to the practical requirements. Alternatively, the images can be uploaded to the internet through mobile networks. In other words, these electronic devices not only have important commercial values but also provide more colorful lives to people.

With the improvement of the living quality, people's demands on the images are gradually increased. For example, most users desire the high-resolution, the wide-angle image and/or the 3D image. Moreover, the portable electronic devices with the high-power optical zooming function are preferred to the users. However, the portable electronic device equipped with a single camera module cannot achieve the above purposes easily. For achieving the above purposes, a portable electronic device with plural camera modules has been disclosed.

Regardless of the number of the camera modules in the portable electronic device, the imaging quality of each camera module is mainly determined according to the result of judging whether the camera module is at a correct installation position and with a correct installation posture. Consequently, before the process of installing the camera module, the worker in the production line performs a camera module aligning method. In accordance with a conventional camera module aligning method, a third-party camera module is used for identification through automated optical inspection (AOI). Due to the tolerance of the mechanical surface of the camera module, the accuracy of the conventional camera module aligning method is usually not satisfied. In accordance with another conventional camera module aligning method, a camera module shoots a backlight plate to acquire an optical axis center, the installation posture of the camera module is calibrated according to the optical axis center, the camera module shoots a test chart, and the installation position is aligned according to the test chart. However, the conventional method is a non-quantitative alignment method, and the alignment is completed after repeated trial-and-error procedures.

In other words, the conventional camera module aligning method needs to be further improved.

SUMMARY OF THE INVENTION

An object of the present invention provides a camera module aligning method. An installation position and an installation posture of the camera module are obtained according to an internal parameter matrix and an external parameter matrix of the camera module.

In accordance with an aspect of the present invention, a camera module aligning method is provided. The camera module aligning method includes the following steps. In a step (S1), a reference chart having plural chart characteristic points is provided. In a step (S2), a camera module is used to shoot the reference chart, and an installation position and an installation posture of the camera module are acquired according to an internal parameter matrix and an external parameter matrix of the camera module. When the camera module shoots the reference chart and an image is formed on an imaging plane of the camera module, a relationship between at least one image characteristic point of the image and the corresponding chart characteristic point complies with a standard relationship. The standard relationship is defined by the internal parameter matrix and the external parameter matrix.

In an embodiment, each chart characteristic point has a world coordinate in a world coordinate system, and each image characteristic point has an image coordinate in an image plane coordinate system.

In an embodiment, the standard relationship is expressed by a mathematic formula:

$$q = K[R|T]Q$$

wherein q is the image coordinate of the image characteristic point in the image plane coordinate system, K is the internal parameter matrix, [R|T] is an external parameter matrix, and Q is the word coordinate of the characteristic point in the world coordinate system.

In an embodiment, the internal parameter matrix K is expressed by a mathematic formula:

$$K = \begin{bmatrix} f & 0 & u_0 & 0 \\ 0 & f & v_0 & 0 \\ 0 & 0 & 1 & 0 \end{bmatrix}$$

wherein f is a focal length of the camera module, and $u_0$ and $v_0$ are coordinates of an image center of the image plane coordinate system.

In an embodiment, the external parameter matrix [R|T] is expressed by a mathematic formula:

$$[R|T] = \begin{bmatrix} r11 & r12 & r13 & T_x \\ r21 & r22 & r23 & T_y \\ r31 & r32 & r33 & T_z \\ 0 & 0 & 0 & 1 \end{bmatrix}$$

wherein R is a rotation matrix, and T is a translation matrix.

In an embodiment, the step (S2) includes the sub-steps. Firstly, the camera module at an initial shooting position and with an initial shooting posture shoots the reference chart, so that the image is formed on the imaging plane. Then, the initial shooting position and the initial shooting posture are calibrated to the installation position and the installation posture according to the internal parameter matrix, the external parameter matrix and the image coordinate of each image characteristic point.

In an embodiment, the reference chart is a checkerboard chart, and the plural chart characteristic points are corner points of the checkerboard chart.

In an embodiment, the internal parameter matrix and the external parameter matrix are obtained by using a standard camera module with qualified assembling quality to shoot the reference chart at different positions and at different angles.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
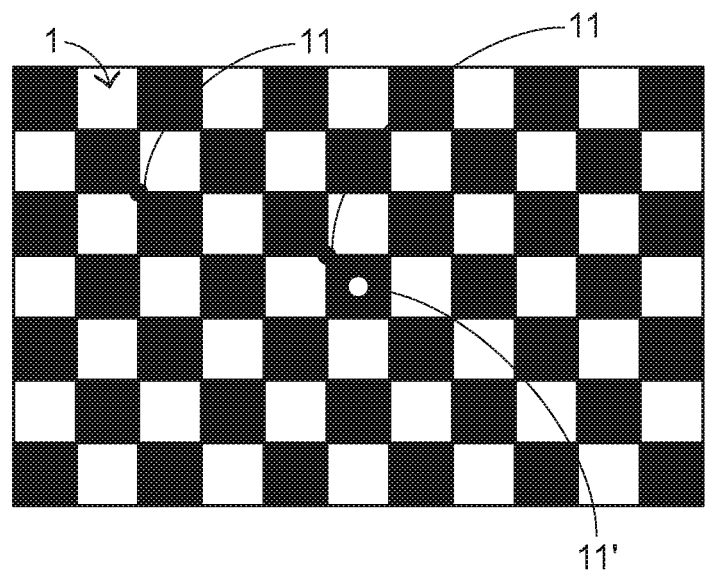
FIG. 1 schematically illustrates a reference chart used in a camera module aligning method according to an embodiment of the present invention.

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 2:
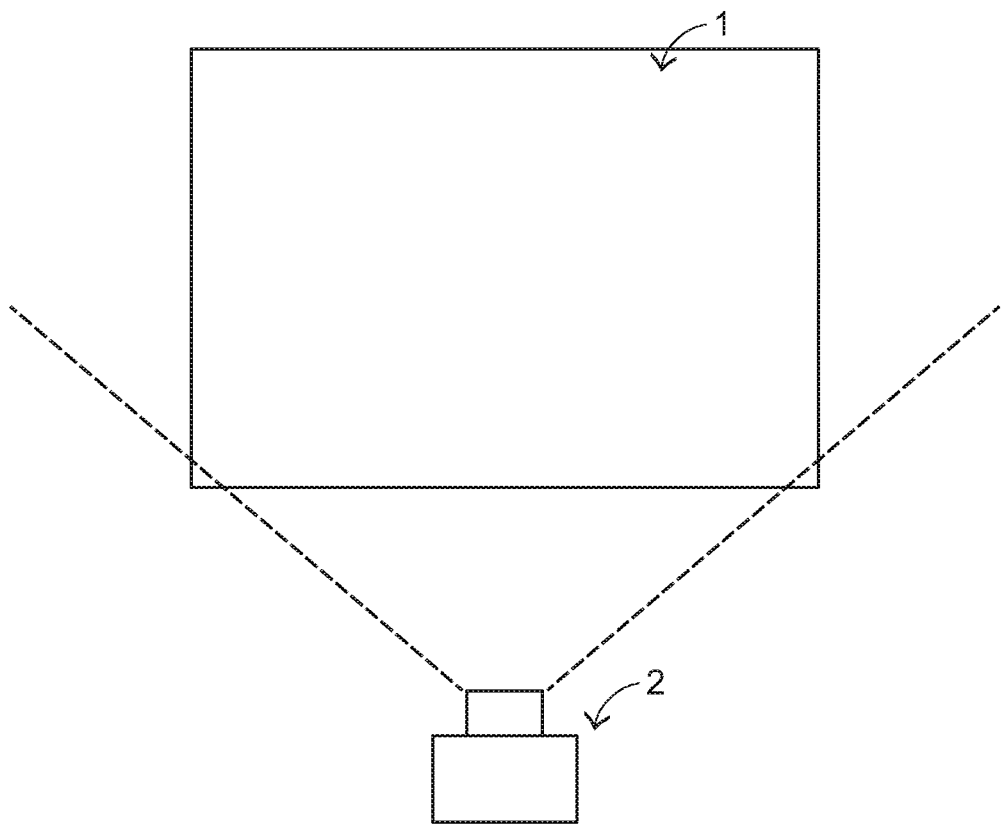
FIG. 2 schematically illustrates a scenario of using the camera module to shoot the reference chart in the camera module aligning method of the present invention.
Figure 3:
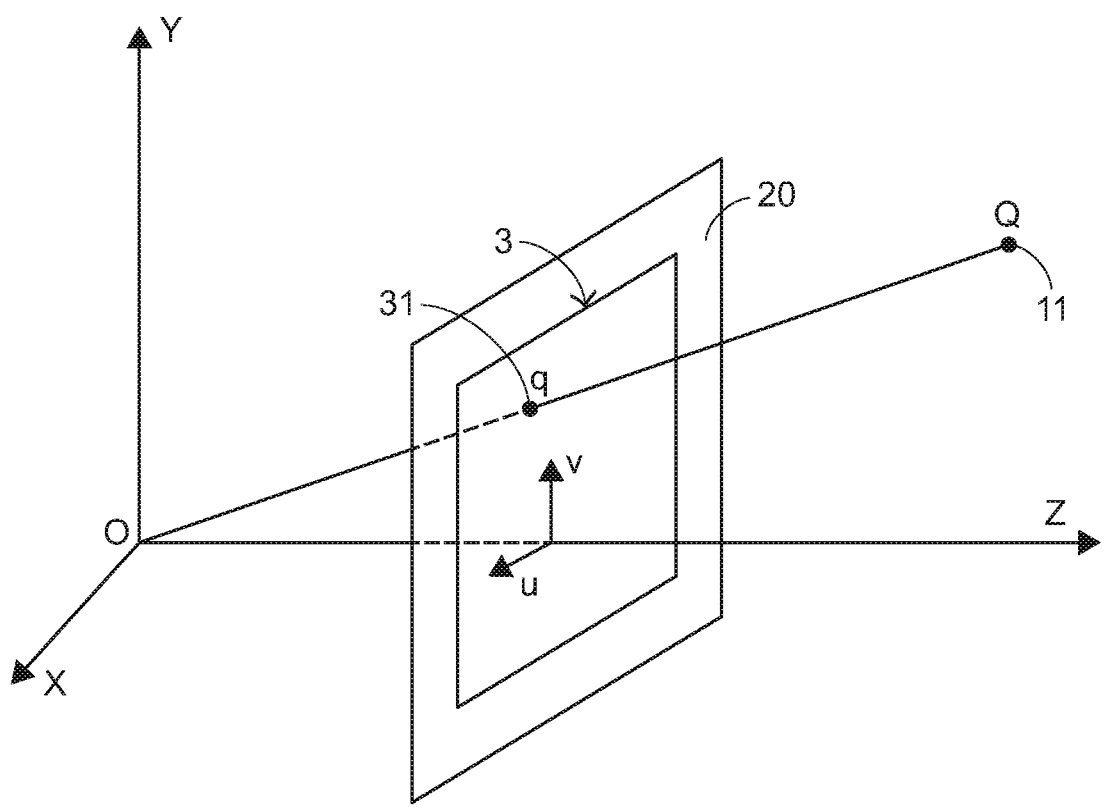
FIG. 3 schematically illustrates the concept of converting a world coordinate into an image coordinate in the scenario of FIG. 2.

Please refer to FIGS. 1, 2 and 3. FIG. 1 schematically illustrates a reference chart used in a camera module aligning method according to an embodiment of the present invention. FIG. 2 schematically illustrates the scenario of using a camera module to shoot a reference chart. FIG. 3 schematically illustrates the concept of converting a world coordinate into an image coordinate in the scenario of FIG. 2.

The reference chart 1 contains plural chart characteristic points 11. For succinctness, only two chart characteristic points are shown in FIG. 1. In the embodiment of FIG. 1, the reference chart 1 is a checkerboard chart. Moreover, the plural chart characteristic points 11 are corner points of the checkerboard chart. That is, the chart characteristic point is the intersection between two adjacent black squares or the intersection between two adjacent white squares. Moreover, each chart characteristic point 11 has a world coordinate in a world coordinate system. As shown in in FIG. 3, the world coordinate system is defined by X, Y and Z coordinate axes.

When a camera module 2 at a shooting position and with a shooting posture shoots the reference chart 1, an image 3 is formed on an imaging plane 20 of the camera module 2 (see FIG. 3). The image 3 contains plural image characteristic points 31 corresponding to the plural chart characteristic points 11 of the reference chart 1. For succinctness, only one chart characteristic point 11 and the corresponding image characteristic point 31 are shown in FIG. 3. Moreover, each image characteristic point 31 has an image coordinate in an image plane coordinate system. As shown in in FIG. 3, the planar coordinate system is defined by u and v coordinate axes. Moreover, there is a standard relationship between each image characteristic point 31 and the corresponding chart characteristic point 11.

In an embodiment, the standard relationship is expressed by the following mathematic formula:

$$q=K[R|T]Q$$

In the above mathematic formula, q is the image coordinate of the image characteristic points 31 in the image plane coordinate system, K is an internal parameter matrix of the camera module 2, [R|T] is an external parameter matrix of the camera module 2, and Q is the word coordinate of the chart characteristic point 11 in the world coordinate system.

Preferably, the internal parameter matrix K and the external parameter matrix [R|T] may be expressed by following mathematic formulae:

$$K = \begin{bmatrix} f & 0 & u_0 & 0 \\ 0 & f & v_0 & 0 \\ 0 & 0 & 1 & 0 \end{bmatrix}, [R|T] = \begin{bmatrix} r11 & r12 & r13 & T_x \\ r21 & r22 & r23 & T_y \\ r31 & r32 & r33 & T_z \\ 0 & 0 & 0 & 1 \end{bmatrix};$$

In the above mathematic formulae, f is a focal length of the camera module 2, $u_0$ and $v_0$ are the coordinates of the image center of the image plane coordinate system, R is a rotation matrix, and T is a translation matrix.

In an embodiment, the internal parameter matrix K and the external parameter matrix [R|T] are obtained by using a standard camera module to perform several shooting actions at different positions and at different angles and estimating the shooting results according to a maximum likelihood estimation (MLE) method. The standard camera module is a camera module with acceptable assembling quality. The methods of obtaining the internal parameter matrix K and the external parameter matrix [R|T] are well known to those skilled in the art, and not redundantly described herein. Moreover, the methods of obtaining the internal parameter matrix K and the external parameter matrix [R|T] are not restricted.

In case that the camera module 2 at a different shooting position and with a different shooting posture is used to shoot the reference chart 1, the image characteristic point 31 corresponding to the same chart characteristic point 11 has a different image coordinate. In case that the reference chart 1 is fixed, the image coordinate of the image characteristic point 31 can be acquired according to the standard relationship between the internal parameter matrix K and the external parameter matrix [R|T] of the camera module 2. If the camera module 2 is precisely aligned during the assembling process, the shooting position and the shooting posture of the camera module 2 are correct. When the camera module 2 at the correct shooting position and with the correct shooting posture shoots the reference chart 1, the image characteristic point 31 of the image 3 acquired by the camera module 2 has a specified image coordinate. Hereinafter, the specified image coordinate is referred as a correct image coordinate.

Figure 4:
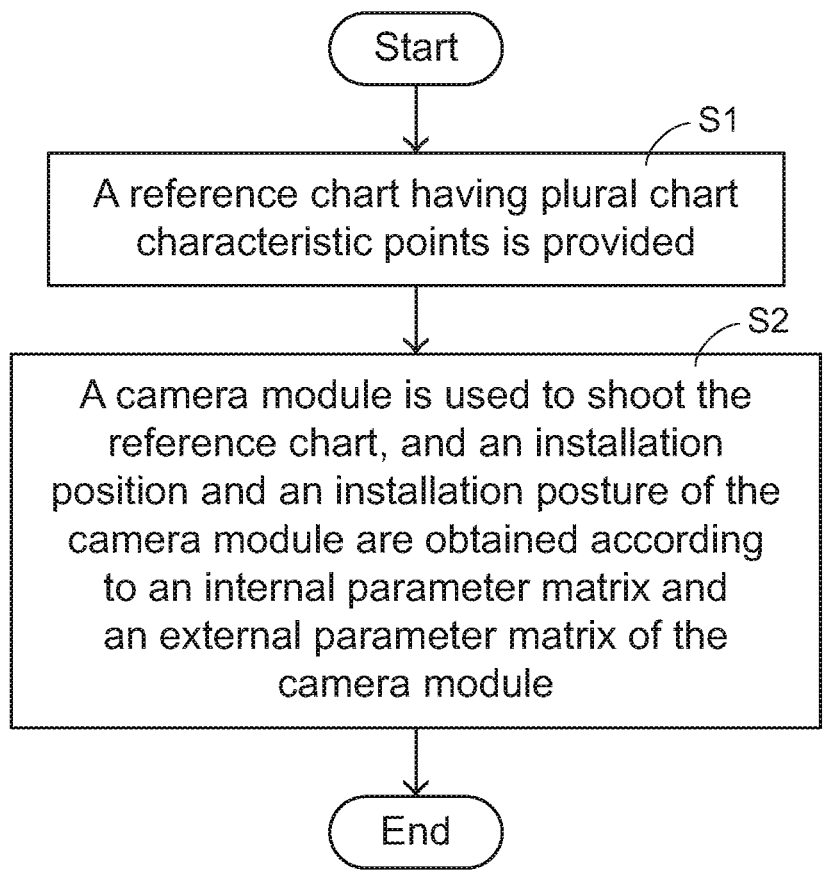
FIG. 4 is a flowchart illustrating a camera module aligning method according to an embodiment of the present invention.

The camera module aligning method of the present invention will be described as follows. FIG. 4 is a flowchart illustrating a camera module aligning method according to an embodiment of the present invention.

Firstly, in a step S1, a reference chart 1 is provided. The reference chart 1 contains plural chart characteristic points 11. Then, the camera module 2 shoots the reference chart 1, and an installation position and an installation posture of the camera module 2 are obtained according to the internal parameter matrix K and the external parameter matrix [R|T] of the camera module 2.

In a step S2, the camera module 2 at an initial shooting position and with an initial shooting posture shoots the reference chart 1, so that an image 3 is formed on an imaging plane 20 of the camera module 2. If the image coordinate of the image characteristic point 31 of the image 3 is not the correct image coordinate, the initial shooting position and the initial shooting posture are respectively calibrated to the correct installation position and the correct installation posture according to the internal parameter matrix K of the camera module 2, the external parameter matrix [R|T] of the camera module 2, the image coordinate of the image characteristic point 31 and the correct image coordinate of the image characteristic point 31.

Figure 5:
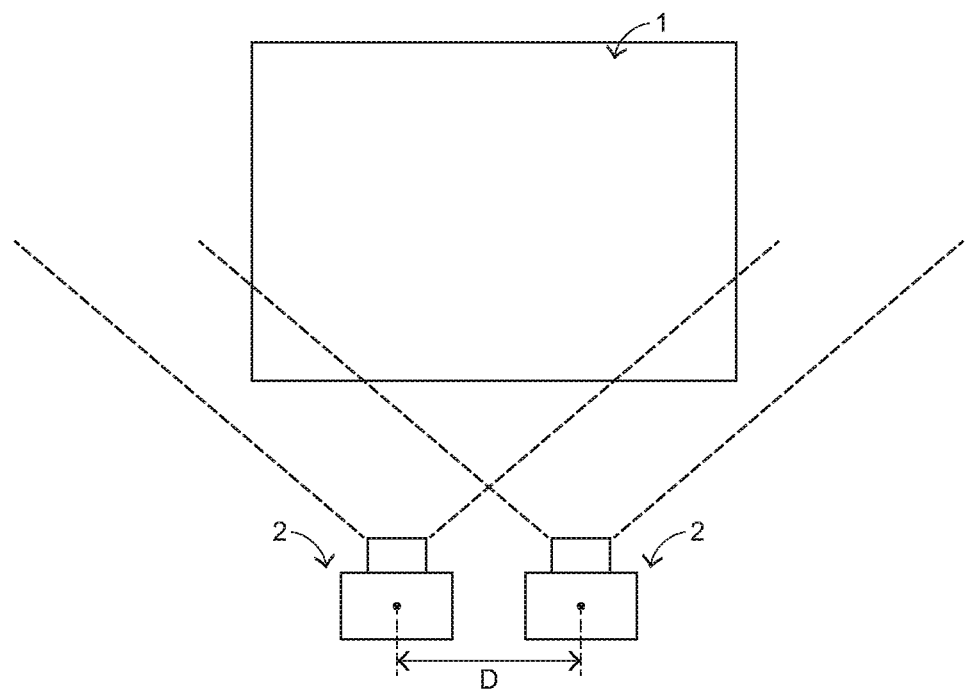
FIG. 5 schematically illustrates another scenario of using plural camera modules to shoot the reference chart in the camera module aligning method of the present invention.

In the above embodiment, the camera module aligning method is applied to a single camera module 2. It is noted that the camera module aligning method of the present invention may be applied to plural camera modules. After the plural camera modules are installed and aligned through the camera module aligning method of the present invention, the installation positions and the installation postures of the plural camera modules are correct. FIG. 5 schematically illustrates another scenario of using plural camera modules to shoot the reference chart in the camera module aligning method of the present invention. As shown in FIG. 5, two cameral modules 2 and 2' are installed and aligned through the camera module aligning method. Consequently, a relative distance D between the two camera modules 2 and 2' is correct. In an embodiment, the two camera modules 2 and 2' are the same types of camera modules. In some other embodiments, the two camera modules 2 and 2' are different camera modules. Since the two camera modules 2 and 2' have different optical elements, the two cameral modules 2 and 2' have different optical viewing angles, different internal parameter matrices and different external parameter matrices.

In another embodiment, the reference chart 1 further contains a chart characteristic point 11' (see FIG. 1). After the two cameral modules 2 and 2' as shown in FIG. 5 shoot the reference chart 1, the camera module 2 acquires the image coordinate q1 of the image characteristic point of the image on the imaging plane and corresponding to the chart characteristic point 11' according to the internal parameter matrix and the external parameter matrix of the camera module 2, and the camera module 2' acquires the image coordinate q2 of the image characteristic point of the image on the imaging plane and corresponding to the chart characteristic point 11' according to the internal parameter matrix and the external parameter matrix of the camera module 2'. According to the difference between the image coordinate q1 and the image coordinate q2, the relative distance between the two cameral modules 2 and 2' can be calculated. Consequently, after the two cameral modules 2 and 2' are installed and aligned, the installation positions and the installation postures of the plural camera modules are correct. In an embodiment, the chart characteristic point 11' is located at a center of the reference chart 1. However, the location of the chart characteristic point 11' may be varied according to the practical requirements.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A camera module aligning method, comprising steps of:
   (S1) providing a reference chart having plural chart characteristic points; and
   (S2) using two camera module shoot the reference chart, and acquiring an installation position and an installation posture of each camera module according to an internal parameter matrix and an external parameter matrix of each camera module, wherein when each camera module shoots the reference chart and an image is formed on an imaging plane of each camera module, a relationship between at least one image characteristic point of the image and the corresponding chart characteristic point complies with a standard relationship, wherein the standard relationship is defined by the internal parameter matrix and the external parameter matrix,
   Wherein the reference chart further contains a chart characteristic point which is located at a center of the reference chart, after a first camera module and a second camera module shoot the reference chart, the first camera module acquires a first image coordinate of the image characteristic point of the image on the imaging plane and corresponding to the chart characteristic point located at a center of the reference chart according to the internal parameter matrix and the external parameter matrix of the first camera module, and the second camera module acquires a second image coordinate of the image characteristic point of the image on the imaging plane and corresponding to the chart characteristic point located at a center of the reference chart according to the internal parameter matrix and the external parameter matrix of the second camera module, according to the difference between the first image coordinate and the second image coordinate, the relative distance between the first camera module and the second camera module can be calculated, and after the first camera module and the second camera module are installed and aligned, the installation positions and the installation postures of the first camera module and the second camera module are correct.

2. The camera module aligning method according to claim 1, wherein each chart characteristic point has a world coordinate in a world coordinate system, and each image characteristic point has an image coordinate in an image plane coordinate system.

3. The camera module aligning method according to claim 2, wherein the standard relationship is expressed by a mathematic formula:

$$q = K[R|T]Q$$

wherein q is the image coordinate of the image characteristic point in the image plane coordinate system, K is the internal parameter matrix, [R|T] is the external parameter matrix, and Q is the word coordinate of the characteristic point in the world coordinate system.

4. The camera module aligning method according to claim 3, wherein the internal parameter matrix K is expressed by a mathematic formula:

$$K = \begin{bmatrix} f & 0 & u_0 & 0 \\ 0 & f & v_0 & 0 \\ 0 & 0 & 1 & 0 \end{bmatrix}$$

wherein f is a focal length of the camera module, and $u_0$ and $v_0$ are coordinates of an image center of the image plane coordinate system.

5. The camera module aligning method according to claim 3, wherein the external parameter matrix [R|T] is expressed by a mathematic formula:

$$[R \mid T] = \begin{bmatrix} r11 & r12 & r13 & T_x \\ r21 & r22 & r23 & T_y \\ r31 & r32 & r33 & T_z \\ 0 & 0 & 0 & 1 \end{bmatrix}$$

wherein R is a rotation matrix, and T is a translation matrix.

6. The camera module aligning method according to claim 2, wherein the step (S2) comprises sub-steps of:
 using the camera module at an initial shooting position and with an initial shooting posture to shoot the reference chart, so that the image is formed on the imaging plane; and
 calibrating the initial shooting position and the initial shooting posture to the installation position and the installation posture according to the internal parameter matrix, the external parameter matrix and the image coordinate of each image characteristic point.

7. The camera module aligning method according to claim 1, wherein the reference chart is a checkerboard chart, and the plural chart characteristic points are corner points of the checkerboard chart.

8. The method according to claim 1, wherein the internal parameter matrix and the external parameter matrix are obtained by using a standard camera module with qualified assembling quality to shoot the reference chart at different positions and at different angles.

* * * * *